Oct. 13, 1931.   A. LONGPRÉ   1,827,531
DEMOUNTABLE WHEEL
Filed April 25, 1931
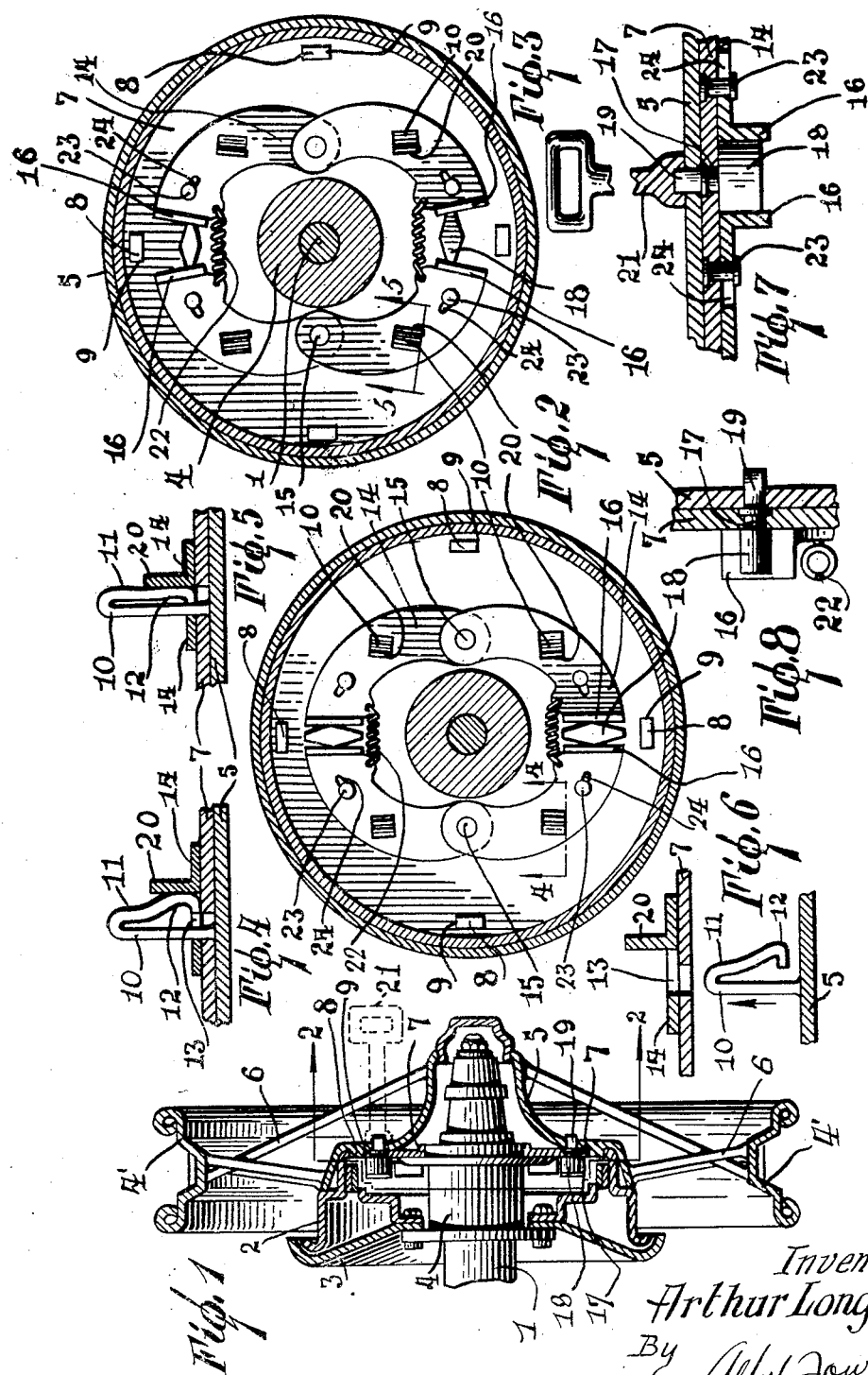
Inventor:
Arthur Longpré
By Albert Fournier
Attorney Patented Oct. 13, 1931

1,827,531

UNITED STATES PATENT OFFICE

ARTHUR LONGPRÉ, OF ST. JOSEPH, QUEBEC, CANADA

DEMOUNTABLE WHEEL

Application filed April 25, 1931, Serial No. 532,867, and in Canada July 31, 1930.

The present invention pertains to a novel demountable wheel of the general type associated with Ford and other automobiles.

This type of wheel now in use has a hub which fits over the brake drum and is held thereto by means of six bolts which must be removed in order to remove the wheel. The principal object of the present invention is to provide a simple means for removing the wheel.

Accordingly the six bolts are dispensed with and are replaced by two expansible spring hooks carried by the hub and adapted to lock in apertures in the brake housing. When it is desired to remove the wheel, these spring hooks must be compressed in order to permit their withdrawal through the apertures. This function is accomplished by means of pivoted levers mounted within the brake and having abutments adapted to compress the spring hooks when the levers are moved. The levers are actuated by means of cams which have head portions extending outwardly through the hub and adapted for engagement by a suitable wrench. Only two such cams are necessary and it follows that the wheel may be removed by the adjustment of two cams instead of the removal of six bolts as is now necessary.

The invention is fully disclosed by way of example in the following description and in the accompanying drawings in which Figure 1 is a diametrical section of a wheel constructed according to the invention;

Figure 2 is a section on the line 2—2 of Figure 1;

Figure 3 is a similar section of the wheel in a different position;

Figure 4 is a section on the line 4—4 of Figure 2;

Figure 5 is a section on the line 5—5 of Figure 3;

Figure 6 is a similar section showing the wheel detached from the hub;

Figure 7 is a plan section view of one of the operating cams; and

Figure 8 is a detail section of the said cam at right angle of Fig. 3.

Reference to these views will now be made by use of like characters which are employed to designate corresponding parts throughout.

In Figure 1 is illustrated an axle 1 on which is mounted in the usual manner a brake drum 2 and closure plate 3 rotating on a suitable bearing 4. The wheel comprises a rim 4' and a hub 5 joined and spaced by a series of wire spokes 6. It will be seen in Fig. 1 that the hub 5 fits over one of the side plates 7 of the brake housing. In order that the hub may be held against turning relatively to the brake drum, it is formed with a series of lugs 8 which fit into correspondingly shaped slots 9 formed in the plate 7 as may be seen in Figs. 1, 2 and 3.

For the purpose of locking the hub to the plate 7, the hub is provided on its inner surface with inwardly extending wire spring hooks 10, each of such hooks being bent over upon itself as at 11 and formed with an angular portion 12 at its free extremity adjacent the hub 5. These spring hooks are adapted for insertion in slots 13 formed in the plate 7. The spring hooks when expanded are wider than the slots, and the spacing of the angular ends 12 from the hub 5 is such as to accommodate the thickness of the plate 7. Consequently, after the springs have been passed through the slots 13 and the members 5 and 7 brought into mutual engagement, the springs expand and overlap the plate 7 outwardly of the slots, thereby locking the hub 5 to the plate 7 as clearly illustrated in Fig. 4.

For the purpose of compressing the spring hooks 10—12 to permit demounting of the wheel when desired, pairs of levers 14 are pivoted together at one end and also to the plate 7 at points 15 as clearly illustrated in Figs. 2 and 3. The free ends of the levers are provided with opposed lugs or flanges 16. Between these lugs, studs 17 are journaled in the plate 7 and are formed with cam members 18 extending into the brake housing and lying between opposed members 16. The studs are further formed with key heads 19 which pass loosely through the hub 5 and are exposed at the outer side thereof for the purpose which will presently appear.

The levers 14 are formed with struck-out tongues 20 lying adjacent and adapted to engage the inbent portions 11 of the spring hooks 10. The parts are so related that when the cams 18 are turned to the position shown in Fig. 3 to separate the opposed lugs 16, the members 20 are swung outwardly to compress the spring hooks as shown in Fig. 5, whereupon these hooks may be drawn through the slots 13, thereby permitting the wheel hub 5 to be detached from the brake housing.

This action is accomplished by means of a box wrench 21 adapted to engage the heads 19 for turning the same as shown in Fig. 7. It will also be seen that opposed levers 14 are normally drawn into engagement with the intermediate cams 18 by means of connecting springs 22. The arms 14 are held against twisting by means of studs 23 extending from the plate 7 into slots 24 formed in the levers.

The ordinary wheel of this type is dismounted by the removal of six bolts, but according to the present invention, it is necessary to turn only the two heads 19 through an angle of 90°. The apertures in the hub 5 for accommodating the heads 19 may be two of the six bolt holes provided in the conventional construction. In mounting the wheel on the brake housing, the spring hooks 10—12 are pushed through the slots 13, and the cams 18 are adjusted to the position shown in Fig. 2 so that the spring hooks may take the locking position illustrated in Fig. 4.

Although a specific embodiment of the invention has been illustrated and described, it will be understood that various alterations in the details of construction may be made without departing from the scope of the invention as indicated by the appended claims.

What I claim is:—

1. A demountable wheel structure comprising a wheel having a hub, a body on which said hub is adapted to fit, spring hooks carried by said hub and adapted to pass through apertures into said body, said hooks being adapted to expand in said body beyond the margins of said apertures, and means for compressing said hooks within said body to permit them to be drawn outwardly through said apertures.

2. A demountable wheel structure comprising a wheel having a hub, a body on which said hub is adapted to fit, spring hooks carried by said hub and adapted to pass through apertures into said body, said hooks being adapted to expand in said body beyond the margins of said apertures, levers pivotally mounted within said body, abutments carried by said levers and adapted to compress said spring hooks to permit them to be drawn outwardly through said apertures, and means for actuating said levers.

3. A demountable wheel structure comprising a wheel having a hub, a body on which said hub is adapted to fit, spring hooks carried by said hub and adapted to pass through apertures into said body, said hooks being adapted to expand in said body beyond the margins of said apertures, levers pivotally mounted within said body, abutments carried by said levers and adapted to compress said spring hooks to permit them to be drawn outwardly through said apertures, cams journaled in said body and engaging said levers, and means exterior of said hub for turning said cams.

4. A demountable wheel structure comprising a wheel having a hub, a body on which said hub is adapted to fit, spring hooks carried by said hub and adapted to pass through apertures into said body, said hooks being adapted to expand in said body beyond the margins of said apertures, levers pivotally mounted within said body, abutments carried by said levers and adapted to compress said spring hooks to permit them to be drawn outwardly through said apertures, cams journaled in said body and engaging said levers, and heads extending from said cams through said hub and adapted for engagement by a turning instrument exteriorly of said hub.

5. A demountable wheel structure comprising a wheel having a hub, a body on which said hub is adapted to fit, spring hooks carried by said hub and adapted to pass through apertures into said body, said hooks being adapted to expand in said body beyond the margins of said apertures, levers pivotally mounted within said body, lugs struck out of said levers and adapted to compress said spring hooks to permit them to be drawn outwardly through said apertures, and means for actuating said levers.

6. A demountable wheel structure comprising a wheel having a hub, a body on which said hub is adapted to fit, spring hooks carried by said hub and adapted to pass through apertures into said body, said hooks being adapted to expand in said body beyond the margins of said apertures, levers pivotally mounted within said body, lugs struck out of said levers and adapted to compress said spring hooks to permit them to be drawn outwardly through said apertures, lugs at the extremities of said levers, cams journaled in said body and engaging the last named lugs, and head extending from said cams through said hub and adapted for engagement by a turning instrument exteriorly of said hub.

In witness whereof I have hereunto set my hand.

ARTHUR LONGPRÉ.